3,023,223
PROCESS FOR PRODUCING ISOIDIDE

Leon W. Wright and John D. Brandner, Wilmington, Del., assignors to Atlas Chemical Industries, Inc., Wilmington, Del., a corporation of Delaware
No Drawing. Filed Feb. 23, 1960, Ser. No. 10,041
4 Claims. (Cl. 260—347.8)

This invention relates to the production of isoidide and more particularly to a process for producing isoidide from other hexides.

Isoidide is the trivial name for 1,4-3,6 dianhydro L-iditol, and is a dihydric, bicyclic ether-alcohol containing fused furan rings. It is readily water-soluble and hygroscopic and is useful as a moisture conditioning agent for paper, cellophane, tobacco and the like. The hydroxyl groups of isoidide readily undergo esterification and etherification. By esterification with mono-carboxylic acids, it may be converted to diesters, which are valuable plasticizers for synthetic resins. Ethers are useful as solvents for various natural and synthetic polymers.

In accordance with the present invention isoidide is produced from isosorbide, isomannide or mixtures of the two by isomerization. The process of the invention comprises heating isosorbide, isomannide, or mixtures of the two under hydrogen pressure and in the presence of a hydrogenation catalyst, all as more fully described and illustrated hereinafter.

The reaction may, if desired, be carried out in the absence of any solvent for the hexide to be isomerized although in the preferred embodiments a solvent, inert towards the hydrogenation conditions, is employed. Particularly suitable solvents are water and the lower aliphatic alcohols, i.e., alcohols containing up to 4 carbon atoms. For reasons of economy water is the preferred solvent. When employing a solvent the extent of dilution therewith is not critical. To avoid the necessity of evaporating, or otherwise removing, excessive amounts of solvent in recovery of the products it is expedient to work with solutions containing no more than 60% solvent. Preferably solutions containing from 25% to 50% solvent are employed.

The temperature at which the isomerization reaction is carried out is quite critical and should be above 210° C. and below 240° C. At lower temperatures the isomerization is impractically slow, while at temperatures above 240° C. excessive degradation to low-molecular weight products occurs. Preferably the reaction temperature is maintained between 220° and 230° C.

The hexides are exposed to this temperature, under hydrogenation conditions, for from 1 to 4 hours, employing, by preference, the longer times when isomerizing at the lower temperatures. When operating in the preferred temperature range of 220° to 230° C. a reaction time of 2 hours has been found particularly suitable.

The hydrogen pressure during the isomerization should be sufficient to establish vigorous hydrogenation conditions. A suitable minimum pressure is 1500 pounds per square inch. The reaction is favored slightly by higher pressures although the effect is not great and, in general, there is no advantage to operating at pressures above about 3000 pounds per square inch.

The hydrogenation catalyst employed in the isomerization process of the invention is a conventional supported nickel catalyst which may, if desired, contain minor proportions of catalyst promoters such as iron and/or copper. Suitably the catalyst may contain from 10% to 40% reduced nickel supported on kieselguhr, diatomaceous earth, silica, alumina, or the like. Sufficient of the supported catalyst should be employed to furnish from about 1% to about 4% nickel, preferably about 2%, based on the hexide content of the isomerizing mixture.

The autoclave discharge product from an isomerization carried out under the range of conditions above-described will contain isoidide, isosorbide, and isomannide. The relative proportions of the three will vary with the hexide charged and with the isomerization conditions. Starting with isosorbide and operating under the preferred conditions indicated above the mixture will contain more than half isoidide, approximately a third isosorbide and less than a tenth isomanide.

Isoidide may be recovered from the isomerization mixture by any suitable means. For example, the mixture of hexides may be converted to readily crystallizable derivatives, such as their benzoic acid esters, and fractionally crystallized from a lower alcohol. Upon saponification of the isoidide benzoate fraction, pure isoidide is liberated.

It has been found, in accordance with this invention, that isoidide may be readily separated from the other isohexides by fractional distillation under reduced pressure. At 2 millimeters of mercury pressure, the fraction distilling at 159° to 162° C. is virtually pure isoidide. Isomannide under this pressure distills at about 128° to 130° C. and isosorbide at 149° to 152° C. These lower boiling fractions can be added to succeeding batches of isohexides to be isomerized to isoidide so that there is little or no by-product to be disposed of when isoidide is produced in accordance with the invention.

The following examples will illustrate more specifically the process which has been described above.

Example I 100 grams (0.685 mols) of isosorbide dissolved in 100 grams distilled water were mixed, under nitrogen, with a sufficient quantity of a nickel catalyst, promoted with 3% of copper and supported on kieselguhr, to yield a slurry containing 2% nickel, based on isosorbide. The slurry was charged into a 1-liter stainless steel stirred autoclave, purged with nitrogen and pressured with hydrogen to 1300 pounds per square inch (gauge). The autoclave and its contents were then heated to 220° C. in 45 minutes and held at that temperature for 2.0 hours. The pressure rose to 2100 p.s.i.g. due to the temperature increase and did not change during the reaction period at temperature. The autoclave was then cooled, the pressure released and the contents discharged. After filtration, the solvent ($H_2O$) was removed by distillation at 20 mm. and the residual isohexide mixture analyzed by vapor phase chromatography. The product analyzed 58.9% isoidide, 35.5% isosorbide, and 5.7% isomannide. This mixture was separated by fractional distillation at 2 mm. pressure. Three cuts were taken: cut #1 boiling range 128°–130° C. was predominantly isomannide, cut #2 boiling range 149°–152° C. was isosorbide, and cut #3 boiling range 159°–162° C. was substantially all isoidide. The isoidide fraction amounted to 59.5 grams and there was substantially no higher boiling residue remaining in the distillation flask.

Example II

The procedure of Example I was followed with the exception that the reaction temperature was 210° C. The isomerization product analyzed as follows: 18.8% isoidide, 74.6% isosorbide, and 6.6% isomannide.

Example III

The procedure of Example I was followed with the exception that the reaction temperature was 230° C. The isomerization product analyzed as follows: 53.6% isoidide, 38.6% isosorbide, and 7.6% isomannide.

Example IV

The procedure of Example I was followed with the exceptions that isopropyl alcohol was substituted for water as the solvent and the catalyst contained no copper promoter. The isomerization product analyzed: 55.7% isoidide, 35.1% isosorbide, and 9.1% isomannide.

*Example V*

The procedure of Example IV was followed with the exception that no solvent was used—the isopropyl alcohol was omitted. (In this example a material recovery of 86% was obtained compared with 95 to 98% material recovery when a solvent was used). The isomerization product analyzed 56.4% isoidide, 34.6% isosorbide, and 9.0% isomannide.

*Example VI*

A solution of 2 parts isosorbide in one part of water was isomerized under the conditions of Example I above except that the time at 220° C. was decreased to one hour. After filtration of the catalyst and evaporation of water, the isomerization product analyzed 49.2% isoidide, 42.7% isosorbide and 8.2% isomannide.

The process of the invention has been described and illustrated in terms of batch operation. It will readily be appreciated by those skilled in the art that the isomerization process can be conducted in continuous fashion, employing, for example, techniques used in continuous hydrogenation of sugars. Such continuous operation is considered equally within the purview of the invention.

What is claimed is:

1. A process for the production of isoidide which comprises heating a member selected from the group consisting of isosorbide, isomannide and mixtures of isosorbide and isomannide at from 220° C. to 230° C. of from 1 to 4 hours, under hydrogen pressure of at least 1500 pounds per square inch, and in the presence of sufficient supported nickel hydrogenation catalyst to furnish from 1% to 4% by weight of nickel based on hexide.

2. A process for the production of isoidide which comprises heating a member selected from the group consisting of isosorbide, isomannide and mixtures of isosorbide and isomannide at from 220° C. to 230° C., for from 1 to 4 hours, under hydrogen pressure of at least 1500 pounds per square inch, and in the presence of sufficient supported nickel hydrogenation catalyst to furnish from 1% to 4% by weight of nickel based on hexide; and separating isoidide from the resulting product.

3. A process as in claim 2 wherein the said separation is accomplished by fractional distillation under reduced pressure.

4. A process for the production of isoidide which comprises heating an aqueous solution of isosorbide at from 220° C. to 230° C. for about 2 hours under hydrogen pressure of about 2000 pounds per square inch in the presence of sufficient supported nickel hydrogenation catalyst to furnish about 2% by weight of nickel on isosorbide; and fractionally distilling the product under reduced pressure to recover isoidide therefrom.

References Cited in the file of this patent

Adkins: Reactions of Hydrogen (1937), page 11.
Fletcher et al.: J. Amer. Chem. Soc., vol. 67 (1945), pp. 1042–3.